United States Patent
Hsu

(10) Patent No.: US 9,188,704 B2
(45) Date of Patent: Nov. 17, 2015

(54) OPTICAL FILM AND METHOD FOR MANUFACTURING THE SAME

(71) Applicant: HON HAI PRECISION INDUSTRY CO., LTD., New Taipei (TW)

(72) Inventor: Chia-Ling Hsu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 267 days.

(21) Appl. No.: 13/726,149

(22) Filed: Dec. 23, 2012

(65) Prior Publication Data

US 2013/0244005 A1    Sep. 19, 2013

(30) Foreign Application Priority Data

Mar. 13, 2012    (TW) .............. 101108544 A

(51) Int. Cl.
- *G02B 1/11* (2015.01)
- *B29D 11/00* (2006.01)
- *G02B 1/118* (2015.01)
- *G02B 27/00* (2006.01)

(52) U.S. Cl.
CPC ........ *G02B 1/11* (2013.01); *B29D 11/00* (2013.01); *G02B 1/118* (2013.01); *G02B 27/0006* (2013.01); *Y10T 428/24521* (2015.01)

(58) Field of Classification Search
IPC ............... B29D 11/00278,11/00298, 11/00788, B29D 11/00; G02B 1/11, 1/118, 27/0006; Y10T 1/118

See application file for complete search history.

(56) References Cited

U.S. PATENT DOCUMENTS

| | | | | |
|---|---|---|---|---|
| 4,898,775 | A * | 2/1990 | Oka et al. | 428/336 |
| 7,303,936 | B2 * | 12/2007 | Chilcott | 438/50 |
| 2006/0213441 | A1 * | 9/2006 | Kobrin et al. | 118/715 |
| 2006/0234413 | A1 | 10/2006 | Chilcott | |
| 2007/0116934 | A1 * | 5/2007 | Miller | 428/172 |
| 2011/0045200 | A1 * | 2/2011 | Hsueh et al. | 427/489 |

FOREIGN PATENT DOCUMENTS

| TW | 200829434 | 7/2008 |
|---|---|---|
| TW | 200909845 | 3/2009 |
| WO | WO2011053004 | 5/2011 |

* cited by examiner

*Primary Examiner* — Mathieu Vargot
(74) *Attorney, Agent, or Firm* — Novak Druce Connolly Bove + Quigg LLP

(57) ABSTRACT

A method of manufacturing an optical film includes: providing a template; coating an aluminum film on one surface of the template; electrolyzing the aluminum film and generating a plurality of regular microstructures on the aluminum film; providing a substrate; transferring the microstructures of the template to the substrate to form a plurality of microstructures on the substrate; and modifying the surfaces of the microstructures of the substrate to obtain a layer containing hydrophobic functional groups on the surfaces of the microstructures of the substrate.

10 Claims, 9 Drawing Sheets

OPTICAL FILM AND METHOD FOR MANUFACTURING THE SAME

BACKGROUND

1. Technical Field

The present invention relates to an optical film and a method of manufacturing an optical film which has anti-reflective and self-cleaning properties.

2. Description of the Related Art

It is very important to reduce reflection of optoelectronic devices so as to improve the utilization efficiency of light. Multilayer anti-reflective films are used to achieve anti-reflective effect, but the cost of the multilayer anti-reflective film is high and the bond between the layers of the multilayer anti-reflective film is weak. Furthermore, the multiplayer anti-reflective film cannot be self-cleaning and may be dirty after a period of time.

Therefore, what is needed is an optical film and a method of manufacturing an optical film having both anti-reflective and self-cleaning properties which can overcome the above mentioned shortcomings.

DETAILED DESCRIPTION

Figure 1:
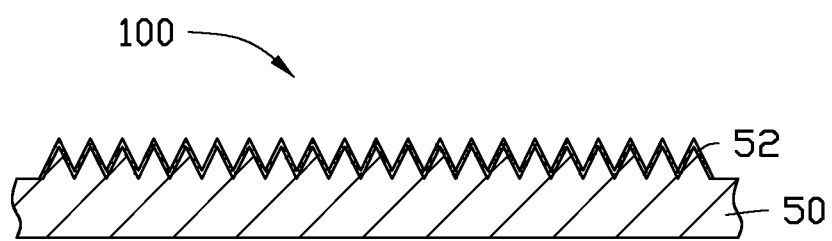
FIG. 1 is a schematic view of an optical film according to a first embodiment.

Referring to FIG. 1, an optical film 100, according to a first embodiment, is shown. The optical film 100 includes a substrate 50 made of a transparent polymer material. The substrate 50 includes a number of cone-shaped micro-protrusions 51. A layer 52 containing hydrophobic-functional-groups is formed on the surfaces of the cone-shaped micro-protrusions 51.

Referring to FIGS. 2-9, a method for manufacturing the optical film 100, according to a second embodiment, is shown. The method includes steps as follows.

Figure 2:
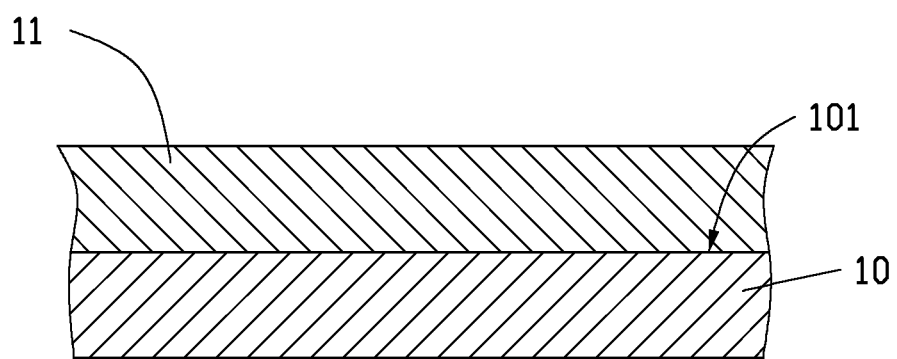
FIGS. 2-9 are schematic views showing the successive stages of a method of manufacturing the optical film of FIG. 1, according to a second embodiment.

In step 1, referring to FIG. 2, a template 10 is provided. The template 10 can be made from monocrystal or metal. In the embodiment, the template 10 is made from monocrystalline silicon. The template 10 includes a polished surface 101. An aluminum film 11 is coated on the polished surface 101 of the template 10. The aluminum film 11 may be coated by a vacuum deposition method, or a magnetron sputtering method, etc.

Figure 3:
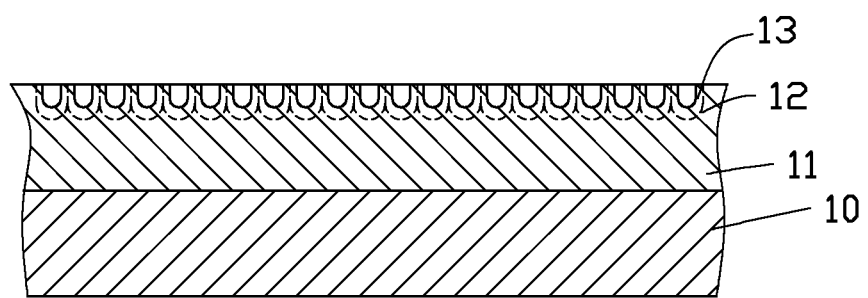
Figure 4:
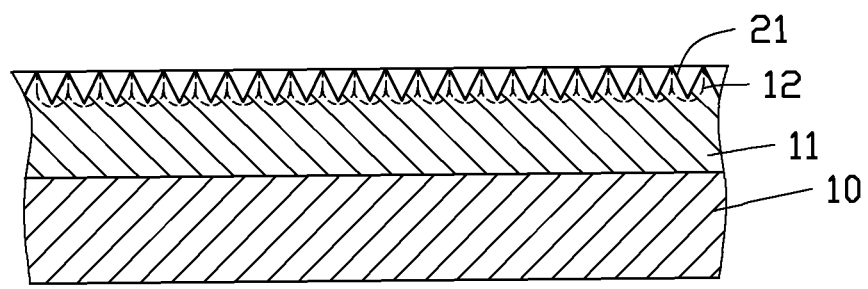

In step 2, referring to FIGS. 3 and 4, a number of regular cone-shaped microstructures 21 are formed on a surface of the aluminum film 11, the microstructures 21 are nano-scale protrusions. In one embodiment, the cone-shaped microstructure 21 is formed in the following manner.

The template 10 with the aluminum film 11 is dipped in the electrolytic oxidation tank which contains an electrolyte solution and a voltage is applied on the electrolyte solution. The aluminum film 11 is anodized to form an alumina layer 12 with a number of micro pores 13. The micro pores 13 are anodic aluminum oxide (AAO) holes. The electrolyte solution can be selected from the group consisting of a sulfuric acid solution, a phosphoric acid solution and an oxalic acid solution. In the embodiment, the electrolyte solution is an oxalic acid solution with a concentration of about 0.3 moles/liters, and the temperature of the electrolyte solution is about 17° C. The anodizing time is about 15 minutes and the voltage is about 40 volts.

Then the template 10 with the micro pores 13 is dipped in a phosphoric acid solution with a concentration of about 5% by weight and the temperature of about 30° C. A voltage is then applied to the phosphoric acid solution to ream the micro pores 13, and the reaming time is about 8 minutes.

The template 10 is cleaned after reaming. The action of reaming and cleaning are repeated for 5 times. A number of regular cone-shaped microstructures 21 with the depth of about 150 nm is formed on the surface of aluminum film 11.

Figure 5:
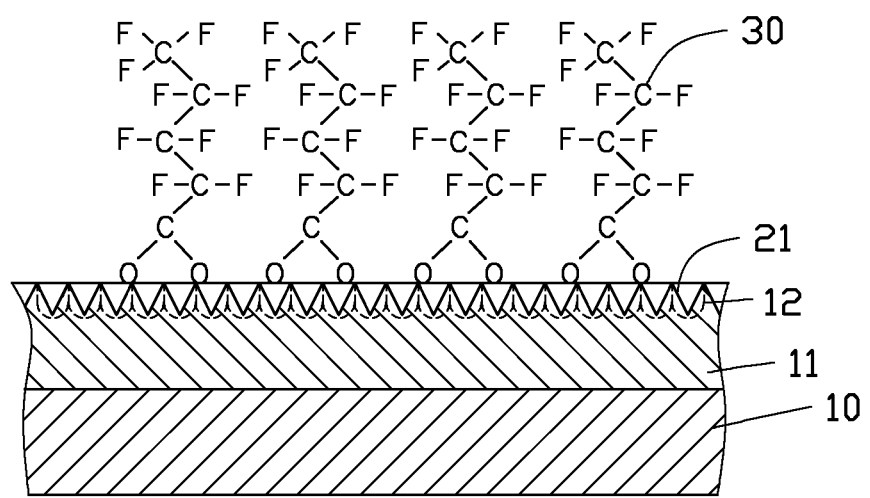
Figure 6:
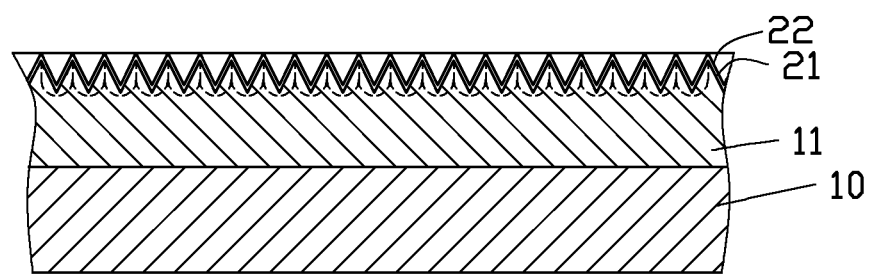

In step 3, referring to FIGS. 5 and 6, a self-assembled monolayer 22 is formed on the surfaces of the regular cone-shaped microstructures 21. In one embodiment, the template 10 with the regular cone-shaped microstructures 21 is placed in a hot vacuum chamber. An inert gas is introduced into the vacuum chamber. The temperature of the vacuum chamber is adjusted to about 200° C. Then long carbon chain perfluorinated fatty acids 30 is introduced into the vacuum chamber. The volume ratio between the long carbon chain perfluorinated fatty acid 30 and the vacuum chamber is about 0.2%. The formula of the long carbon chain fluorinated fatty acid 30 is $CF_3(CF_2)_n COOH$ wherein n=3, 6, 8, 10, or 16. The long carbon chain perfluorinated fatty acid 30 is gasified at a high temperature. The long carbon chain perfluorinated fatty acid 30 and the anodic aluminum oxide take place chemical grafting reaction under the condition of annealing in the vacuum chamber and a high hydrophobic self-assembled monolayer 22 is generated on the surfaces of the regular cone-shaped microstructures 21. In the embodiment, the annealing time is about 3 hours. The purpose of generating the self-assembled monolayer 22 on the surfaces of the regular tapered microstructures 21 is to increase the mold release ability in a later hot embossing step.

In step 4, the template 10 is washed after the chemical grafting reaction. In this step, the template 10 is cooled to room temperature, and then scoured successively by chloroform, acetone, ethanol and deionized water. The chloroform is used for removing the excess of long carbon chain perfluorinated fatty acid 30. The acetone, ethanol and deionized water are used for reducing polarity and removing the organic solvent on a surface of the self-assembled monolayer 22.

Figure 7:
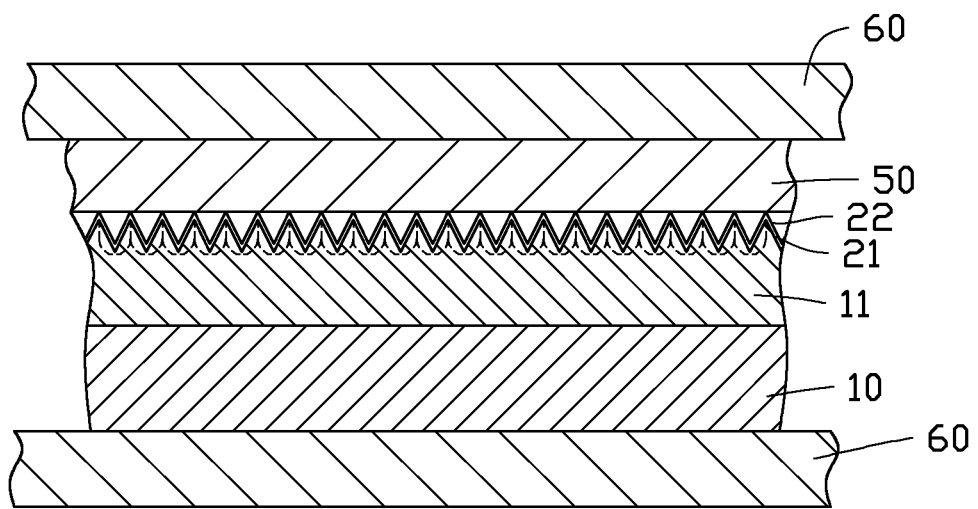
Figure 8:
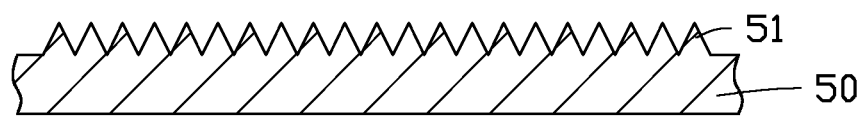

In step 5, referring to FIGS. 7 and 8, a substrate 50 is provided. The cone-shaped microstructures 21 of the template 10 are transferred to the substrate 50. The material of the substrate 50 is poly methyl methacrylate (PMMA). In one embodiment, the substrate 50 is placed facing with the cone-shaped microstructures 21, and then the substrate 50 and the template 10 as a entirety are placed in a hot embossing machine 60. The hot embossing machine 60 is heated to a glass transition temperature of the substrate 50. The glass transition temperature of the substrate 50 is about 120° C. The shape of the cone-shaped microstructures 21 is printed on the substrate 50. Accordingly, the substrate 50 with the cone-shaped micro-protrusions 51 is obtained.

Figure 9:
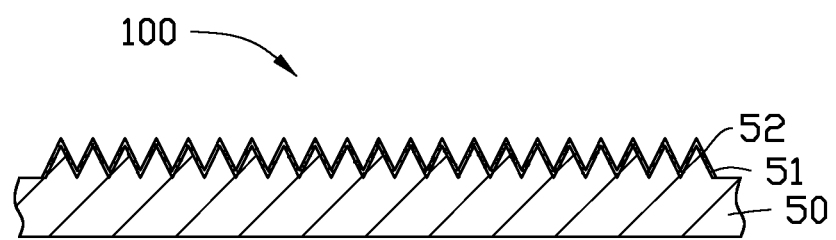

In step 6, referring to FIG. 9, a hydrophobic-functional-group layer 52 is formed on the surfaces of the cone-shaped micro-protrusions 51 and the optical film 100 is obtained. In one embodiment, the substrate 50 with the micro-protrusions 51 is placed in a plasma machine and a carbon tetrafluoride ($CF_4$) gas is gradually introduced into the plasma machine. Under the plasma condition, hydrogen atoms in the carbon chain of PMMA are replaced by the fluorine atoms of $CF_4$. In this way, the layer 52 containing the hydrophobic-functional-groups is obtained. The surface energy of the PMMA is reduced by the chemical reaction. The contact angle between the surface of the optical film 100 and water is greater than 150 degrees according to Cassie-Baxter model.

The optical film 100 manufactured by the above mentioned method has anti-reflective and self-cleaning properties.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A method for manufacturing an optical film, comprising:
   providing a template;
   coating an aluminum film on a surface of the template;
   forming a number of regular cone-shaped microstructures on a surface of the aluminum film;
   providing a substrate made of a transparent polymer material;
   transferring the cone-shaped microstructures on the surface of the aluminum film to the substrate to form a number of cone-shaped micro-protrusions on the substrate; and
   modifying the surfaces of the cone-shaped micro-protrusions on the substrate to obtain a layer containing hydrophobic-functional-groups on the surfaces of the cone-shaped micro-protrusions on the substrate;
   wherein forming a number of regular cone-shaped microstructures on a surface of the aluminum film comprises:
      putting the template into an electrolytic oxidation tank containing electrolyte;
      applying a voltage on the electrolyte to form an alumina layer on the surface of the aluminum film, with a number of cone-shaped micro pores formed on the surface of the alumina layer;
      dipping the template with the micro pores in a phosphoric acid solution with a concentration of about 5% by weight and the temperature of about 30° C.;
      applying another voltage to the phosphoric acid solution to ream the micro pores;
      cleaning the template; and
      repeatedly applying the another voltage to the phosphoric acid solution to ream the micro pores and cleaning the template for 5 times.

2. The method of claim 1, wherein the surface of the template is a polished surface.

3. The method of claim 1, wherein the template is made from monocrystal or metal.

4. The method of claim 1, wherein the electrolyte is selected from the group consisting of sulfuric acid solution, phosphoric acid solution and oxalic acid solution.

5. The method of claim 1, wherein the material of the substrate is poly methyl methacrylate.

6. The method of claim 1, further comprising: forming a self-assembled monolayer on the surfaces of the cone-shaped microstructures after anodizing the aluminum film and before transferring the cone-shaped microstructures on the surface of the aluminum film to the substrate.

7. The method of claim 6, wherein the step of forming the self-assembled monolayer comprises:
   putting the template with the regular cone-shaped microstructures in a vacuum chamber;
   introducing one kind of inert gas into the vacuum chamber; and
   introducing a long carbon chain perfluorinated fatty acids into the vacuum chamber.

8. The method of claim 7, wherein the step of forming the self-assembled monolayer further comprises:
   cooling the template to a room temperature; and
   scouring the self-assembled monolayer successively by chloroform, acetone, ethanol and deionized water.

9. The method of claim 1, wherein the step of modifying the surfaces of the micro-protrusions of the substrate to obtain a layer containing hydrophobic-functional-groups comprises: introducing a gas into a plasma machine.

10. The method of claim 9, wherein the gas introduced into the plasma machine is carbon tetrafluoride.

\* \* \* \* \*